(12) United States Patent
Chou

(10) Patent No.: US 10,114,152 B2
(45) Date of Patent: Oct. 30, 2018

(54) PHOTOGRAPHING LENS MODULE AND ELECTRONIC DEVICE

(71) Applicant: LARGAN PRECISION CO., LTD., Taichung (TW)

(72) Inventor: Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 219 days.

(21) Appl. No.: 15/092,868

(22) Filed: Apr. 7, 2016

(65) Prior Publication Data

US 2017/0219745 A1    Aug. 3, 2017

(30) Foreign Application Priority Data

Feb. 3, 2016   (TW) .............................. 105201774 U

(51) Int. Cl.
*G02B 27/00*   (2006.01)
*G02B 5/00*    (2006.01)
*G02B 1/04*    (2006.01)
*G02B 13/18*   (2006.01)

(52) U.S. Cl.
CPC ............. *G02B 5/003* (2013.01); *G02B 1/041* (2013.01); *G02B 13/18* (2013.01)

(58) Field of Classification Search
CPC .......... G02B 13/18; G02B 9/34; G02B 5/005; G02B 13/00; G02B 5/0278; G02B 21/24; G02B 5/045; G02B 27/0018; G02B 3/00; G02B 25/001; G02B 7/02; G02B 7/021; G03B 11/04

See application file for complete search history.

(56) References Cited

U.S. PATENT DOCUMENTS

| 7,391,457 | B2 | 6/2008 | Fujimoto et al. |
| 7,545,583 | B2 | 6/2009 | Hayashi et al. |
| 7,965,445 | B2 | 6/2011 | Chen et al. |
| 8,031,412 | B2 | 10/2011 | Shintani |
| 8,102,609 | B2 | 1/2012 | Tsuchiya et al. |
| 8,736,989 | B2 | 5/2014 | Wu |
| 9,019,617 | B2 | 4/2015 | Tsai |
| 2004/0158322 | A1* | 8/2004 | Shen ................ A61F 2/1635 623/6.33 |

(Continued)

FOREIGN PATENT DOCUMENTS

CN            203759336 U       8/2014

*Primary Examiner* — William R Alexander
*Assistant Examiner* — Tamara Y Washington
(74) *Attorney, Agent, or Firm* — McClure, Qualey & Rodack, LLP

(57) ABSTRACT

A photographing lens module includes a plurality of lens elements, wherein one of the lens elements is a plastic lens element, and at least one surface of an object-side surface and an image-side surface of the plastic lens element includes an effective optical portion and a peripheral portion. The effective optical portion is aspheric. The peripheral portion surrounds the effective optical portion, and includes a plurality of strip rib structures and a plurality of light absorbing coatings. Each of the strip rib structures has a strip shape along a radial direction of an optical axis of the plastic lens element, and the strip rib structures are arranged around the effective optical portion. The light absorbing coatings are coated on the strip rib structures respectively.

17 Claims, 15 Drawing Sheets

(56) References Cited

U.S. PATENT DOCUMENTS

| | | | |
|---|---|---|---|
| 2013/0265656 A1* | 10/2013 | Asami, I | B60R 1/00 359/752 |
| 2014/0078606 A1* | 3/2014 | Wu | G02B 7/025 359/827 |
| 2015/0103407 A1 | 4/2015 | Chen | |
| 2017/0176649 A1* | 6/2017 | Chang | G02B 5/003 |

* cited by examiner

PHOTOGRAPHING LENS MODULE AND ELECTRONIC DEVICE

RELATED APPLICATIONS

This application claims priority to Taiwan Application Serial Number 105201774, filed Feb. 3, 2016, which is herein incorporated by reference.

BACKGROUND

Technical Field

The present disclosure relates to a photographing lens module. More particularly, the present disclosure relates to a photographing lens module which is applicable to portable electronic devices.

Description of Related Art

Due to the popularity of personal electronic products and mobile communication products having camera functionalities, such as smart phones and tablet personal computers, the demand for compact photographing lens modules has been increasing and the requirements for high resolution and image quality of present compact photographing lens modules increase significantly.

A plastic lens element is generally used to effectively reduce the manufacturing cost of the photographing lens module. A conventional plastic lens element is typically formed by an injection molding method and has a smooth and bright surface, which is featured with high reflectivity. Accordingly, when the non-imaging light is reflected from the surfaces of other optical elements of the photographing lens module to the surface of the plastic lens element, the non-imaging light reflected from the surface of the plastic lens element cannot be effectively attenuated and would be incident on the surfaces of lens elements of the photographing lens module.

For suppressing the non-imaging light of the photographing lens modules, one of the conventional methods is applying ink on the lens elements. That is placing a lens element on a turntable, applying the ink on the edge of the lens element by a brush and drying the ink by air or heating. However, the method could not be applied in the plastic lens elements with compact sizes and high accuracy due to the variation of ink applying exceeds the scale of the plastic lens elements. On the other hand, removing the excess ink by wiping is also difficult for the plastic lens elements. To solve the problem, the technology of the optical refractive index matching layer configured in a gap between the black barrel and the lens element has been developed in order to reduce the reflection in the edge of the lens element, but there are many limitations to configure the optical refractive index matching layer.

Given the above, a surface property of the plastic lens element relates to the image quality of the photographing lens module. How to reduce the non-imaging light reflected from the surface of the plastic lens element has become one of the important subjects, so that the image quality of the compact photographing lens modules can be enhanced, and the requirements of high-end optical systems with camera functionalities can be satisfied.

SUMMARY

According to one aspect of the present disclosure, a photographing lens module includes a plurality of lens elements, wherein one of the lens elements is a plastic lens element, and at least one surface of an object-side surface and an image-side surface of the plastic lens element includes an effective optical portion and a peripheral portion. The effective optical portion is aspheric. The peripheral portion surrounds the effective optical portion, and includes a plurality of strip rib structures and a plurality of light absorbing coatings. Each of the strip rib structures has a strip shape along a radial direction of an optical axis of the plastic lens element, and the strip rib structures are arranged around the effective optical portion. The light absorbing coatings are coated on the strip rib structures respectively.

According to another aspect of the present disclosure, an electronic device includes a photographing lens module according to the foregoing aspect.

DETAILED DESCRIPTION

1st Embodiment

Figure 1A:
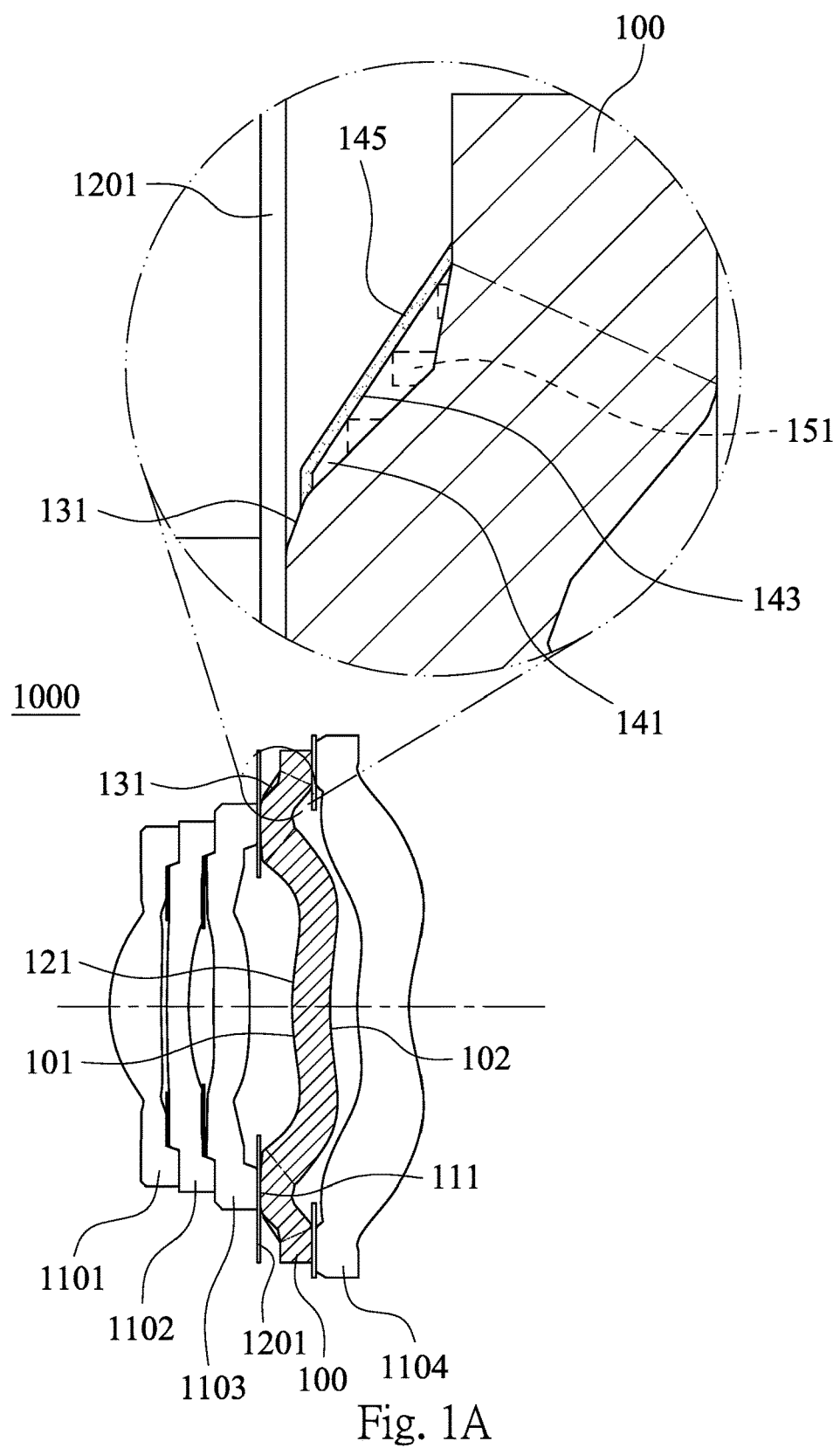
FIG. 1A is a schematic view of a photographing lens module according to the 1st embodiment of the present disclosure.

FIG. 1A is a schematic view of a photographing lens module 1000 according to the 1st embodiment of the present disclosure. In FIG. 1A, the photographing lens module 1000 includes a plurality of lens elements, wherein one of the lens elements is a plastic lens element 100, and at least one surface of an object-side surface 101 and an image-side surface 102 of the plastic lens element 100 (the aforementioned surface is the object-side surface 101 in the 1st embodiment) includes an effective optical portion 121 and a peripheral portion 131.

The effective optical portion 121 is aspheric, wherein the incident light passes through the effective optical portion 121 and forms the image on an image surface (not shown herein).

Figure 1B:
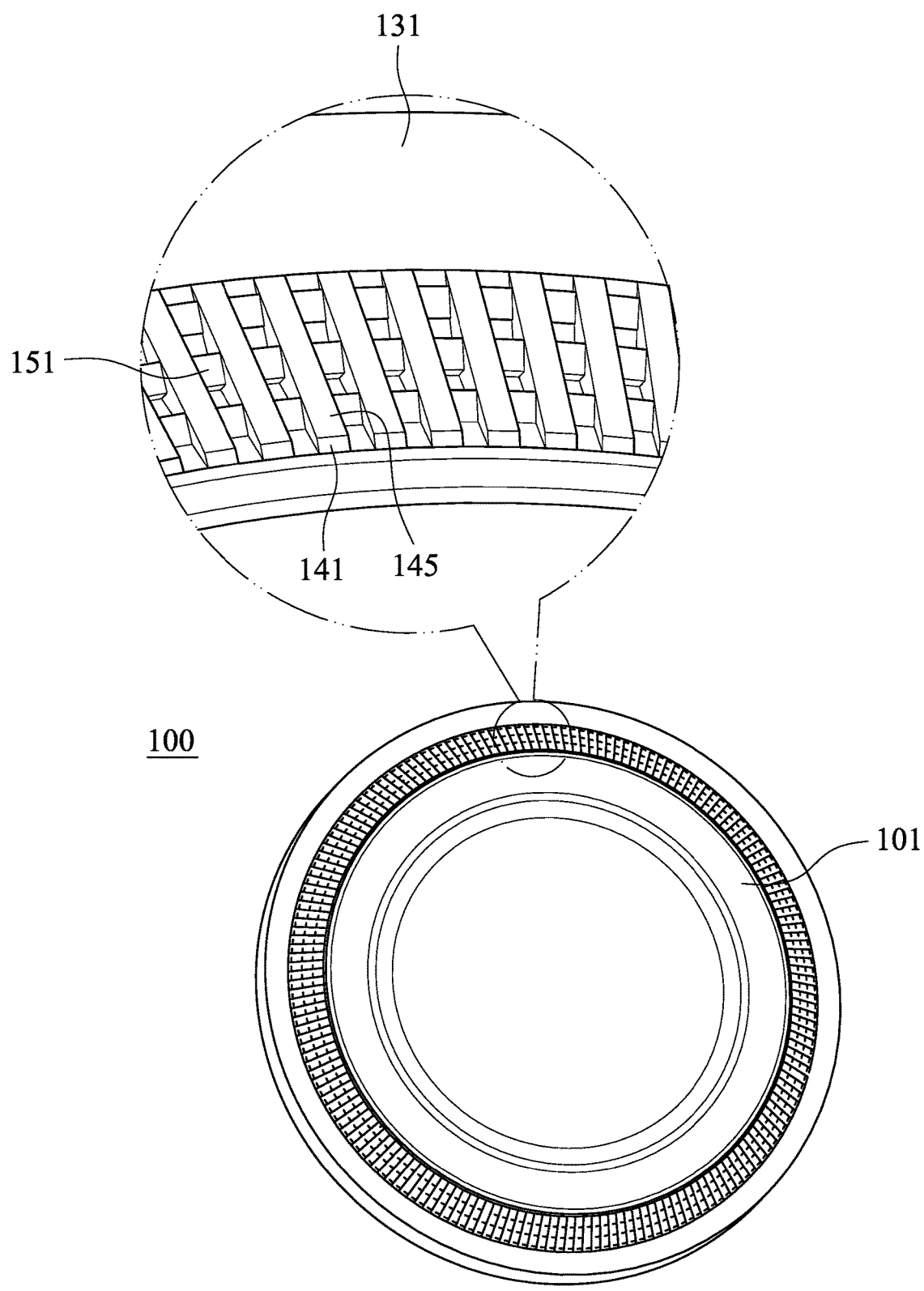
FIG. 1B is a schematic view of the plastic lens element according to the 1st embodiment.

FIG. 1B is a schematic view of the plastic lens element 100 according to the 1st embodiment. In FIG. 1A and FIG. 1B, the peripheral portion 131 surrounds the effective optical portion 121, and includes a plurality of strip rib structures 141 and a plurality of light absorbing coatings 145. Each of the strip rib structures 141 has a strip shape along a radial direction of an optical axis of the plastic lens element 100, and the strip rib structures 141 are arranged around the effective optical portion 121. Therefore, it is favorable for effectively attenuating the non-imaging light reflected from the surface of the plastic lens element 100.

The light absorbing coatings 145 are coated on the strip rib structures 141 respectively. In detail, the light absorbing coatings 145 can be at least coated on the part of the surface area of the strip rib structures 141 respectively. Therefore, it is favorable for further effectively attenuating the non-imaging light reflected from the surface of the plastic lens element 100 so as to enhance the image quality of the photographing lens module 1000.

In FIG. 1B, the strip rib structures 141 can be arranged as a plurality of stepped shapes along a circumferential direction of the plastic lens element 100. That is, the strip rib structures 141 are protruded from the peripheral portion 131, each of the strip rib structures 141 has an outline with angles instead of smooth curves along the circumferential direction of the plastic lens element 100, and the protrusions of the strip rib structures 141 are arranged as the stepped shapes on the peripheral portion 131. Therefore, it is favorable for increasing the roughness of the plastic lens element 100 so as to diverge the non-imaging light.

In the 1st embodiment, a number of the strip rib structures 141 is n, and the following condition can be satisfied: 90<n<720. Therefore, it is favorable for maintaining the denseness of the strip rib structures 141 so as to reflect hardly.

FIG. 10 is a schematic view of the parameters w and t of the plastic lens element 100 according to the 1st embodiment. In FIG. 10, a width of each of the strip rib structures 141 is w, and the following condition can be satisfied: 0.01 mm<w<0.12 mm. Therefore, it is favorable for reducing the surface flatness of the plastic lens element 100 so as to diverge the non-imaging light.

In FIG. 1A, at least one surface of each of the strip rib structures 141 can include a light diminishing surface 143, which can be a rough surface. The light diminishing surfaces 143 of each of the strip rib structures 141 can be disposed on all surfaces of each of the strip rib structures 141, or on the surface facing an imaged object (not shown herein) thereof, and each of the light diminishing surfaces 143 can be at least disposed on the part of the area thereof. Therefore, it is favorable for reducing uneven adhesion of the light absorbing coatings 145 resulted from the surface tension of the light absorbing coatings 145 in the fluid stage, so that the light absorbing coatings 145 can be firmly coated on the light diminishing surfaces 143. In the 1st embodiment, each of all surfaces of each of the strip rib structures 141 includes one of the light diminishing surfaces 143, wherein each of the light diminishing surfaces 143 is disposed on whole area of the surface thereof. Each of the light diminishing surfaces 143 is a rough surface, and each of the light absorbing coatings 145 is coated on all of the light diminishing surfaces 143 disposed on all surfaces of each of the strip rib structures 141.

Furthermore, a surface roughness of each of the light diminishing surfaces 143 is Ra, and the following condition can be satisfied: 0.1 μm<Ra. Therefore, it is favorable for release of the plastic lens element 100 so as to improve the completion of the injection molding of the plastic lens element 100.

The light absorbing coatings 145 can be made of black resin materials. Therefore, it is favorable for reducing the reflection of the non-imaging light so as to enhance the image quality. In detail, the material of the light absorbing coatings 145 can be an oil-based paint such as a quick-drying ink with resin, epoxy resin or acrylic as a base, or a paint mixed with light-cured gel and ink particles. Due to the light absorbing coatings 145 are made of resin and ink particles, the light absorbing coatings 145 has flow characteristics initially so as to avoid the curing process after coating and increasing the coating efficiency.

Figure 1C:
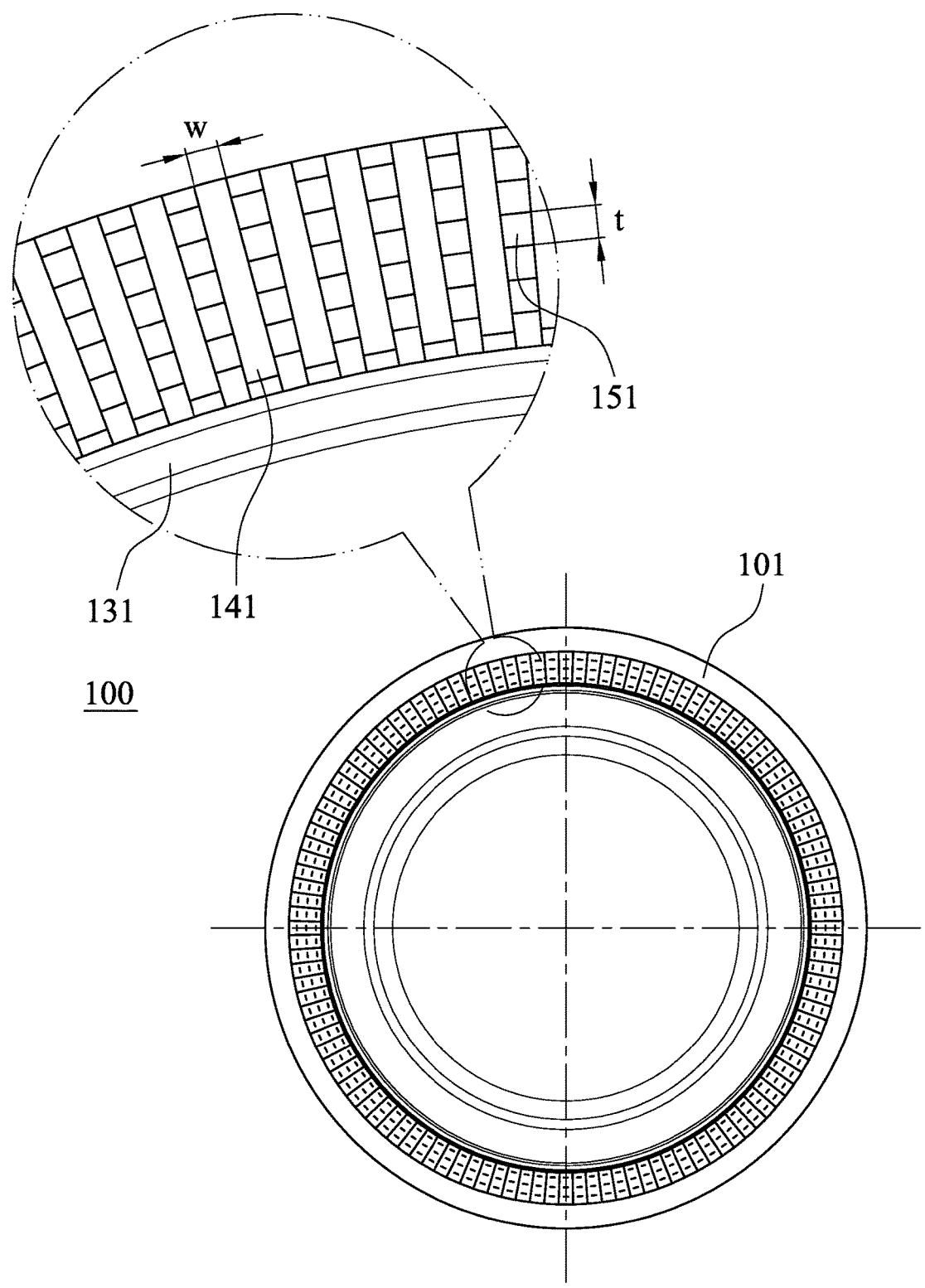
FIG. 1O is a schematic view of the parameters w and t of the plastic lens element according to the 1st embodiment.
FIG. 1D is a schematic view of the light absorbing coatings coated by a needle according to the 1st embodiment.
Figure 1D:
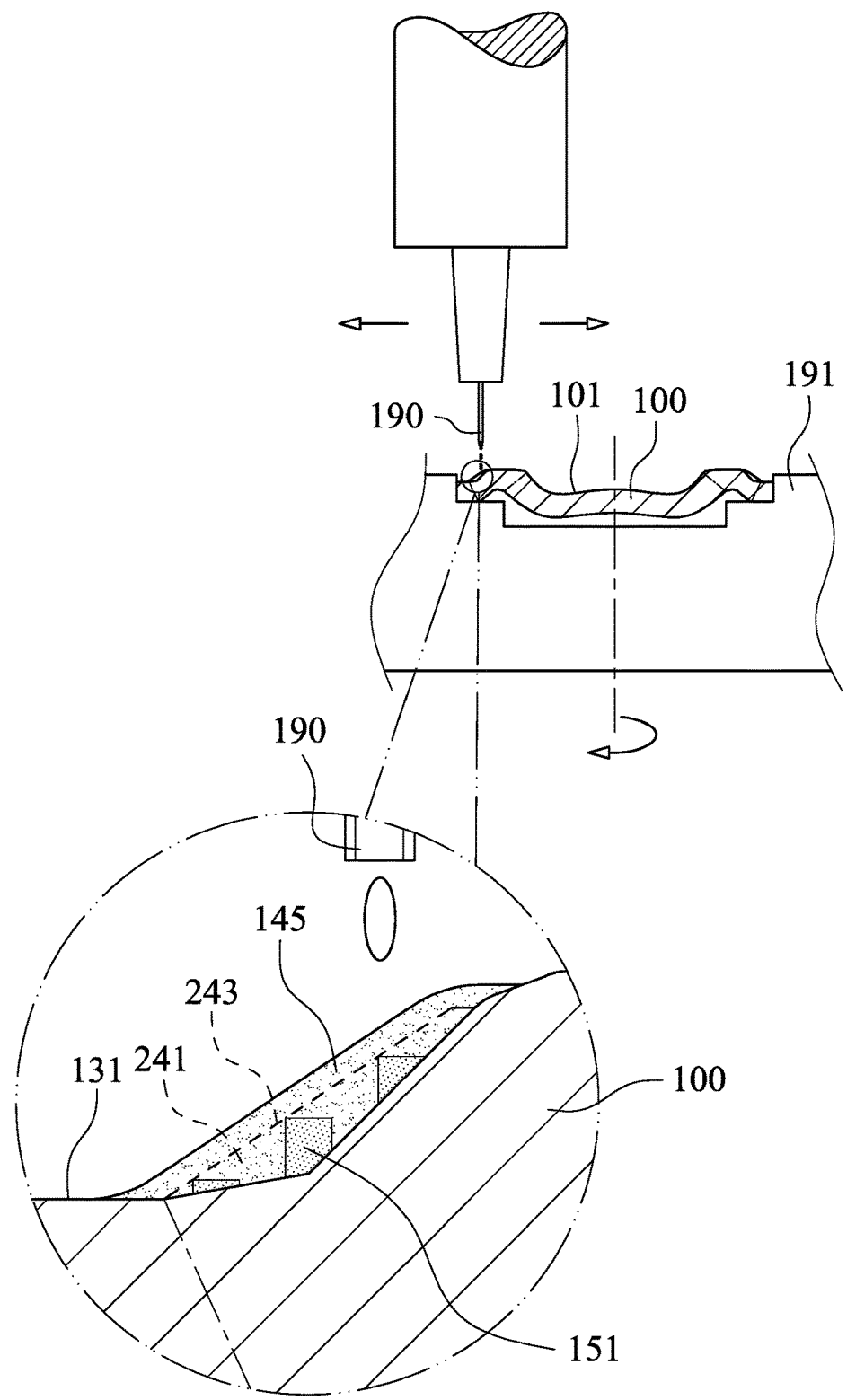

FIG. 1D is a schematic view of the light absorbing coatings 145 coated by a needle according to the 1st embodiment. In FIG. 1D, the light absorbing coatings 145 can be coated by a needle 190. Therefore, it is favorable for effectively controlling the coating range of the light absorbing coatings 145. The steps of the light absorbing coatings 145 coated by the needle 190 include placing the plastic lens element 100 with the image-side surface 102 upwards on a lens element platform 191, which can be a fixture of a single lens element or an array plate of multiple lens elements for fixing the plastic lens element 100, and placing the needle 190 above the strip rib structures 141 of the plastic lens element 100. The lens element platform 191 and the needle 190 have degrees of freedom to move or rotate relatively. Then the light absorbing coatings 145 can be coated intermittently. In the 1st embodiment, the coating range of the light absorbing coatings 145 is controlled by rotating of the lens element platform 191 and moving of the needle 190. When the flowing black resin paint is applied on the strip rib structures 141 with the needle 190, the flowing black resin paint can spread evenly over the light diminishing surfaces 143 of the strip rib structures 141, and stop to spread on the smooth surfaces of the peripheral portion 131. Then the light absorbing coatings 145 are formed. Due to the low absorption of the smooth surfaces of the peripheral portion 131, the flowing black resin paint hardly spreads from the light diminishing surfaces 143 of the strip rib structures 141 to the smooth surfaces of the peripheral portion 131, so that the coating range of the light absorbing coatings 145 can be controlled and the smooth surfaces of the peripheral portion 131 can be prevented from the light absorbing coatings 145.

In FIG. 1B, the light absorbing coatings 145 can be connected to each other for forming an annular shape. In detail, a groove bottom (its reference numeral is omitted) or a connection structure (its reference numeral is omitted) between any two of the strip rib structures 141 adjacent to each other can include a light diminishing surface (its reference numeral is omitted), each of the light absorbing coatings 145 can be not only coated on each of the strip rib structures 141 but also extended to be coated on the groove bottom or the connection structure between two of the strip rib structures 141. Hence, the light absorbing coatings 145 can be connected to each other for forming the annular shape and surround the effective optical portion 121. Therefore, it is favorable for satisfying the requirements of suppressing the non-imaging light of the photographing lens module 1000.

In FIG. 1A to FIG. 10, the peripheral portion 131 can further include at least one annular rib structure 151 surrounding the effective optical portion 121 and intersecting with the strip rib structures 141. Therefore, it is favorable for satisfying the requirements of suppressing the non-imaging light of the photographing lens module 1000.

A number of the annular rib structure 151 can be at least two, and the annular rib structures 151 and the strip rib structures 141 can be formed as a woven pattern. In detail, the annular rib structures 151 and the strip rib structures 141 are intersected as a grid pattern. Therefore, it is favorable for enhancing the adhesion of the light absorbing coatings 145. In 1st embodiment, the number of the annular rib structures 151 is three. The annular rib structures 151 and the strip rib structures 141 are intersected and formed as the woven pattern, which is the grid pattern, wherein a height of the annular rib structures 151 relative to the peripheral portion 131 is smaller than a height of the strip rib structures 141 relative to the peripheral portion 131.

The annular rib structures 151 can be coated with the light absorbing coatings 145. In detail, each of the light absorbing coatings 145 is coated on whole area of all surfaces of each of the strip rib structures 141. The light absorbing coatings 145 are connected to each other for forming the annular shape. The annular rib structures 151 intersect with the strip rib structures 141. Hence, the annular rib structures 151 can be coated with the light absorbing coatings 145. Therefore, it is favorable for further effectively attenuating the non-imaging light reflected from the surface of the plastic lens element 100 so as to enhance the image quality of the photographing lens module 1000.

Moreover, the annular rib structures 151 can be arranged as a plurality of stepped shapes along a radial direction of the plastic lens element 100. That is, the annular rib structures 151 are protruded from the peripheral portion 131, each of the annular rib structures 151 has an outline with angles instead of smooth curves along the radial direction of the plastic lens element 100, and the protrusions of the annular rib structures 151 are arranged as the stepped shapes on the peripheral portion 131. At least one surface of each of the annular rib structures 151 can include a light diminishing surface (its reference numeral is omitted), which can be a rough surface. The light diminishing surfaces aforementioned of each of the annular rib structures 151 can be disposed on all surfaces of each of the annular rib structures 151, or on the surface facing the imaged object thereof.

In FIG. 1C, a width of each of the annular rib structures 151 is t, and the following condition can be satisfied: 0.01 mm<t<0.12 mm. Therefore, it is favorable for reducing the surface flatness of the plastic lens element 100 so as to diverge the non-imaging light.

In FIG. 1A, a number of the lens elements of the photographing lens module 1000 can be at least four, wherein one of the lens elements is the plastic lens element 100. Therefore, it is favorable for increasing the feasibility of correcting the curved image of the photographing lens module 1000. In 1st embodiment, the photographing lens module 1000 includes, in order from an object side to an image side, lens elements 1101, 1102, 1103, the plastic lens element 100 and a lens element 1104. The photographing lens module 1000 has a total of five lens elements. In other embodiments (not shown herein), the photographing lens module can have a total of four, six, seven or more lens elements. Furthermore, the photographing lens module 1000 including the plastic lens element 100 can be disposed in a barrel (not shown herein) so as to block a lot of non-imaging light. It is favorable for avoiding the non-imaging light entering the portions of the lens element other than the effective optical portion and preventing from unnecessary reflection among the lens elements.

The plastic lens element 100 can be the fourth lens element of the photographing lens module 1000 in order from the object side to the image side. Therefore, it is favorable for reducing the surface reflection in the field of view. In 1st embodiment, the plastic lens element 100 is the fourth lens element of the photographing lens module 1000 in order from the object side to the image side.

The effective optical portion 121 can have a wavy shape. Moreover, the effective optical portion having the wavy shape means the effective optical portion including at least one concave shape in an off-axial region thereof while the effective optical portion is convex in a paraxial region thereof, or the effective optical portion including at least one convex shape in the off-axial region thereof while the effective optical portion is concave in the paraxial region thereof. Therefore, it is favorable for enhancing the resolution of the plastic lens element 100. In the 1st embodiment, the effective optical portion 121 of the object-side surface 101 has a wavy shape.

The object-side surface 101 of the plastic lens element 100 can further include an object-side abutting area 111, which is orthogonal to the optical axis of the plastic lens element 100 and can be abutted with the optical elements of the photographing lens module 1000 such as a lens element, a spacer or a light blocking sheet. The strip rib structures 141 can be farther from the effective optical portion 121 than the object-side abutting area 111. Therefore, it is favorable for maintaining the stable optical quality of the photographing lens module 1000 after assembling and increasing the divergence efficiency of the reflected light so as to avoid the reflected light incident on the image surface of the photographing lens module 1000. In 1st embodiment, the photographing lens module 1000 further includes a spacer 1201 disposed between the lens element 1103 and the plastic lens element 100, wherein the object-side abutting area 111 is abutted with the spacer 1201, and the strip rib structures 141 are farther from the effective optical portion 121 than the object-side abutting area 111.

The data of the aforementioned parameters of the photographing lens module 1000 according to the 1st embodiment of the present disclosure are listed in the following Table 1, wherein the parameters are also shown as FIG. 1C.

TABLE 1

| 1st Embodiment | |
|---|---|
| Ra (μm) | 0.4~1.12 |
| w (mm) | 0.04 |
| t (mm) | 0.04 |

2nd Embodiment

Figure 2A:
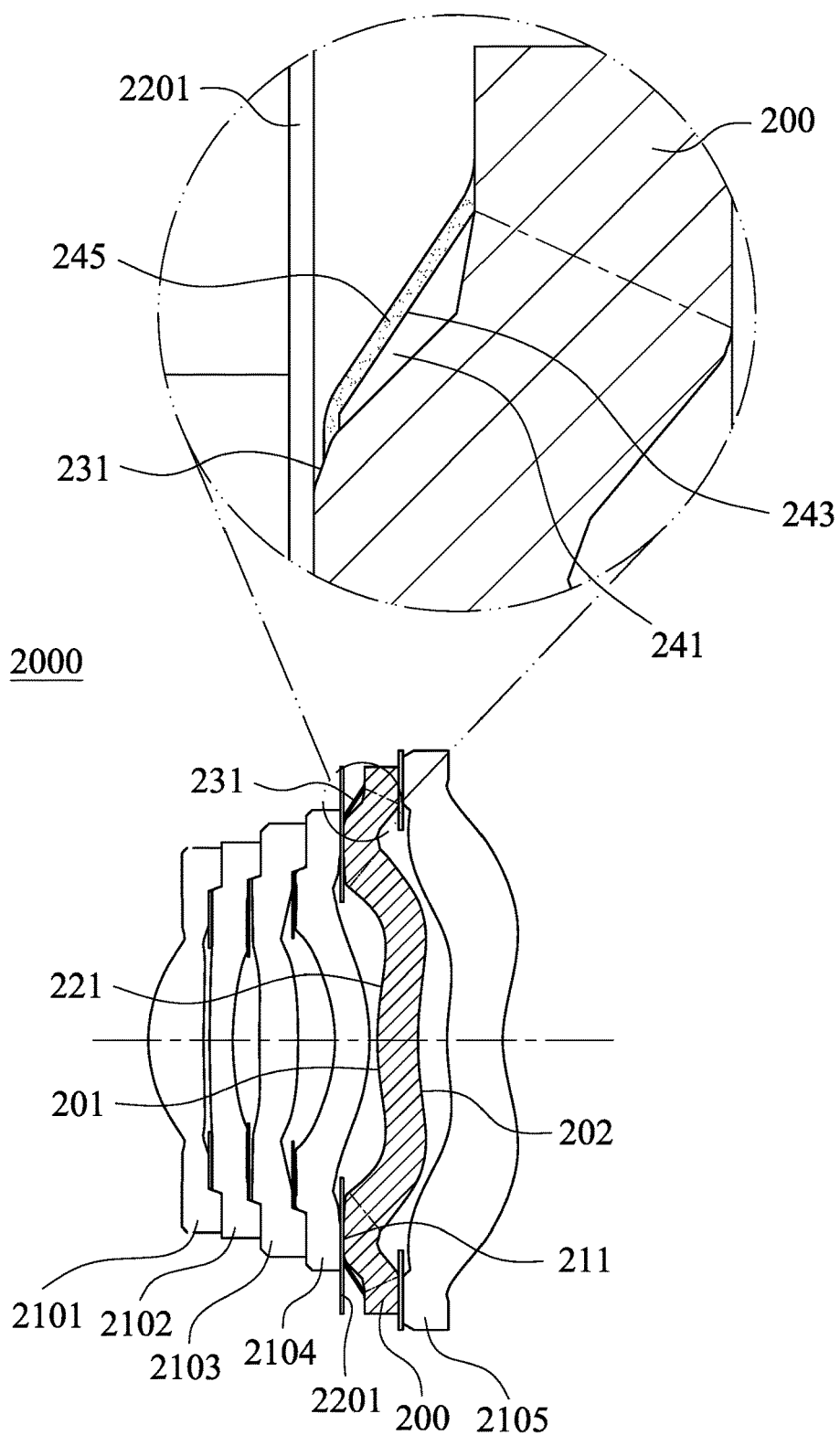
FIG. 2A is a schematic view of a photographing lens module according to the 2nd embodiment of the present disclosure.

FIG. 2A is a schematic view of a photographing lens module 2000 according to the 2nd embodiment of the present disclosure. In FIG. 2A, the photographing lens module 2000 includes a plurality of lens elements, wherein one of the lens elements is a plastic lens element 200, and at least one surface of an object-side surface 201 and an image-side surface 202 of the plastic lens element 200 (the aforementioned surface is the object-side surface 201 in the 2nd embodiment) includes an effective optical portion 221 and a peripheral portion 231.

Figure 2B:
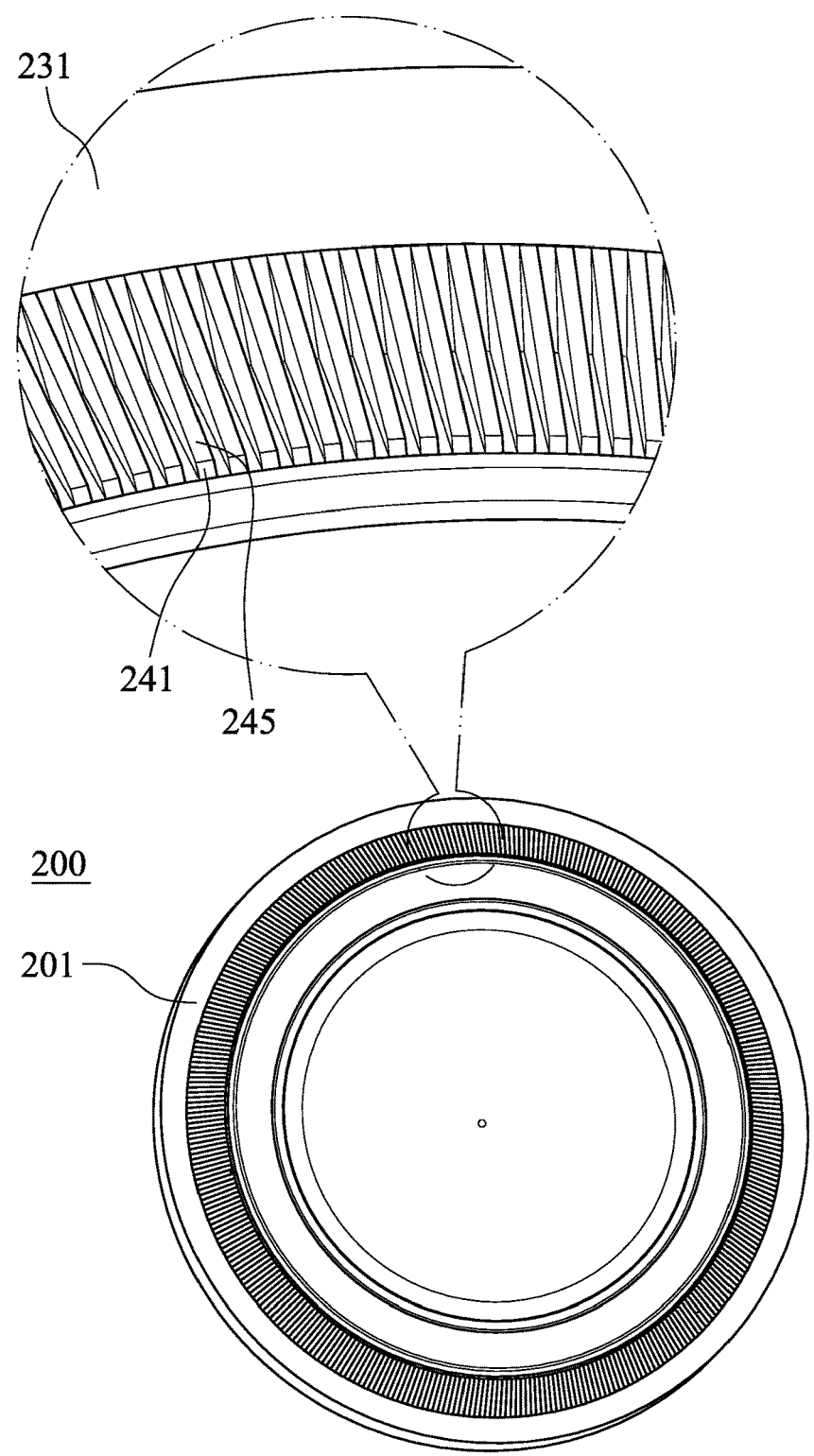
FIG. 2B is a schematic view of the plastic lens element according to the 2nd embodiment.
Figure 2C:
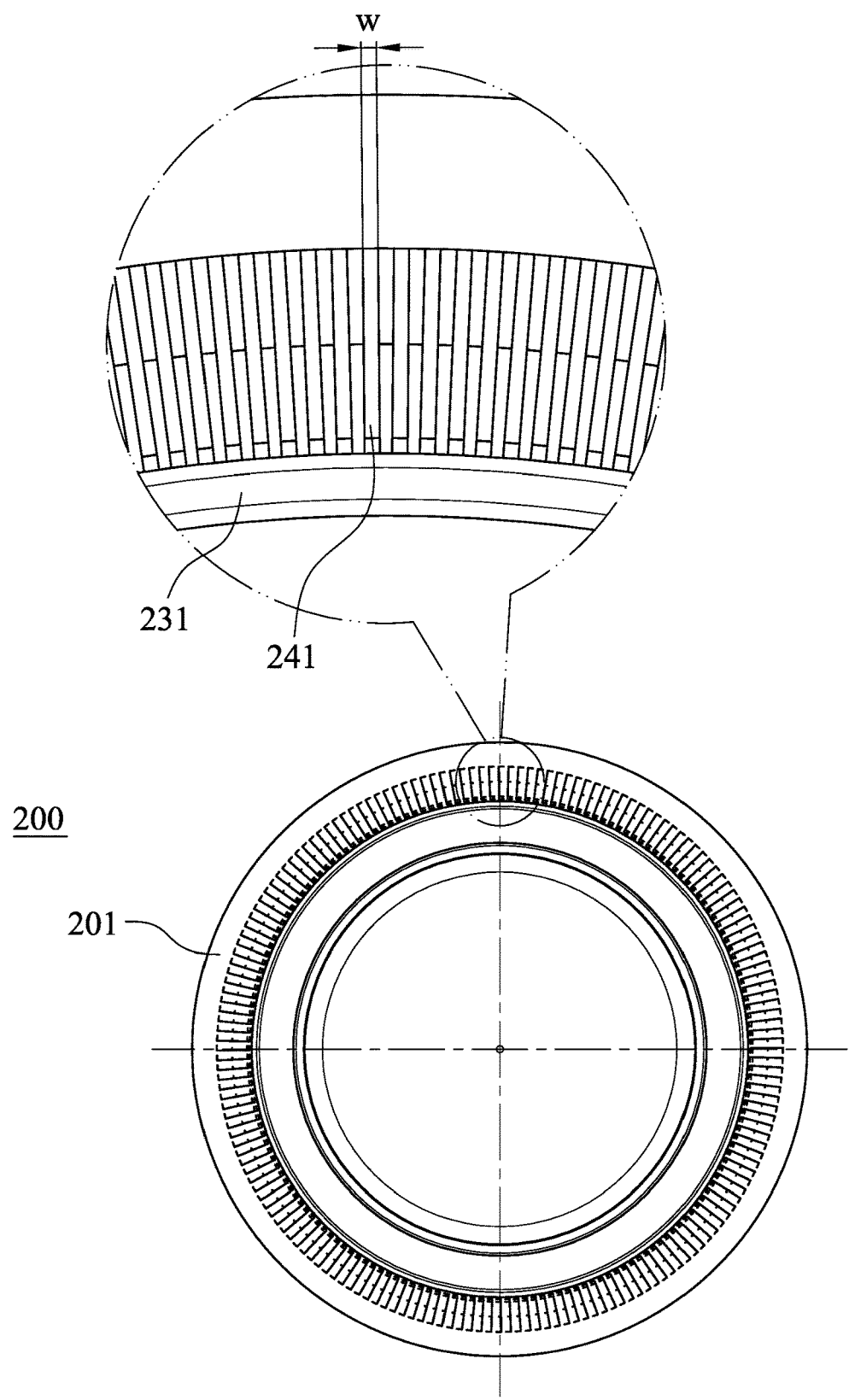
FIG. 2C is a schematic view of the parameter w of the plastic lens element according to the 2nd embodiment.

FIG. 2B is a schematic view of the plastic lens element 200 according to the 2nd embodiment, and FIG. 2C is a schematic view of the parameter w of the plastic lens element 200 according to the 2nd embodiment. In FIG. 2A to FIG. 2C, the effective optical portion 221 is aspheric. The peripheral portion 231 surrounds the effective optical portion 221, and includes a plurality of strip rib structures 241 and a plurality of light absorbing coatings 245. Each of the strip rib structures 241 has a strip shape along a radial direction of an optical axis of the plastic lens element 200, and the strip rib structures 241 are arranged around the effective optical portion 221. The light absorbing coatings 245 are coated on the strip rib structures 241 respectively.

In FIG. 2B, the strip rib structures 241 are arranged as a plurality of stepped shapes along a circumferential direction of the plastic lens element 200. A number of the strip rib structures 241 is n, and the following condition is satisfied: 90<n<720.

In FIG. 2A and FIG. 2B, a surface facing an imaged object (not shown herein) of each of the strip rib structures 241 includes a light diminishing surface 243, which is a rough surface. Each of the light absorbing coatings 245 is coated on each of the light diminishing surfaces 243 of the strip rib structures 241. Furthermore, the light absorbing coatings 245 are made of black resin materials and connected to each other for forming an annular shape.

Figure 2D:
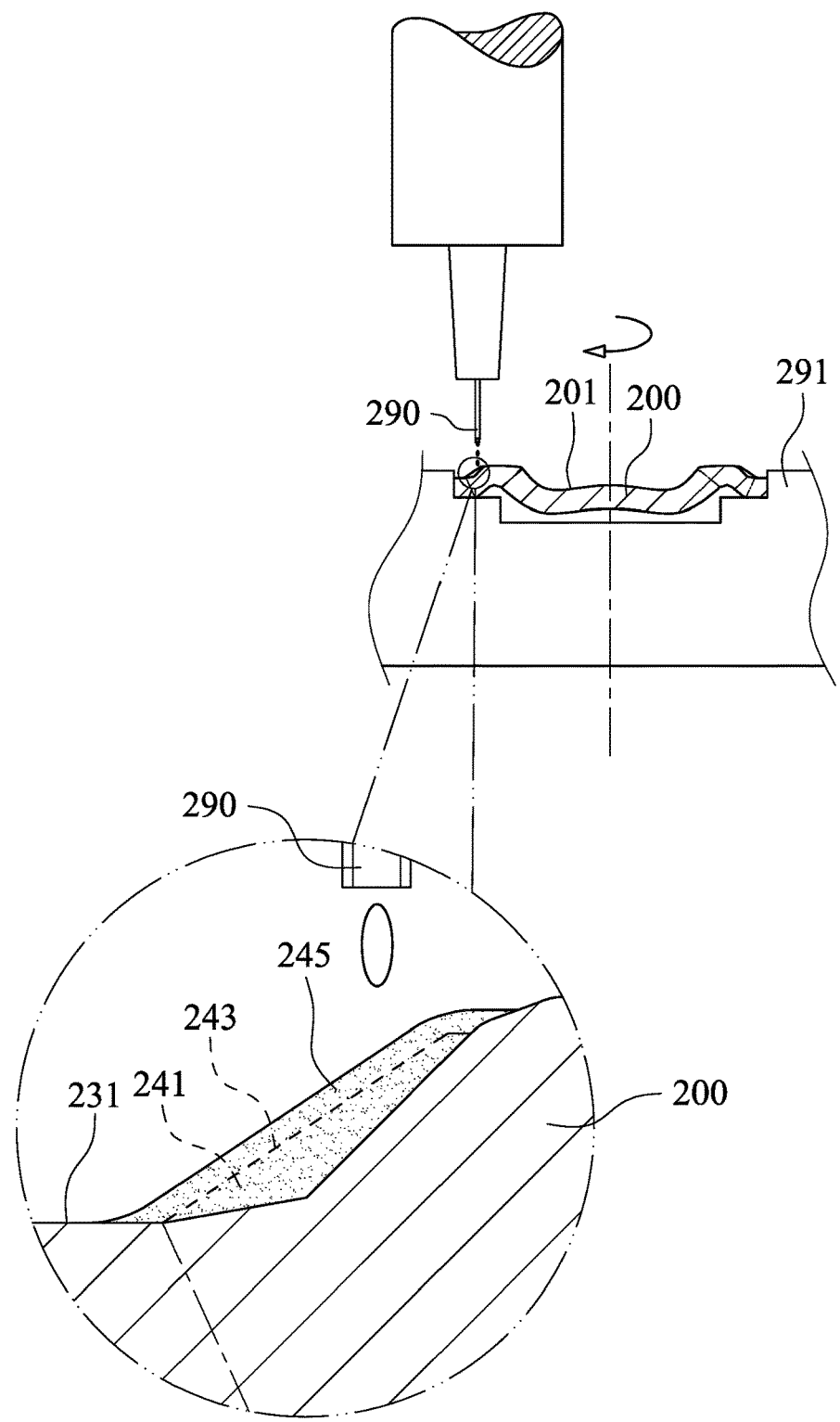
FIG. 2D is a schematic view of the light absorbing coatings coated by a needle according to the 2nd embodiment.

FIG. 2D is a schematic view of the light absorbing coatings 245 coated by a needle according to the 2nd embodiment. In FIG. 2D, the light absorbing coatings 245 are coated by a needle 290. The steps of the light absorbing coatings 245 coated by the needle 290 include placing the plastic lens element 200 with the image-side surface 202 upwards on a lens element platform 291, and placing the needle 290 above the strip rib structures 241 of the plastic lens element 200. The coating range of the light absorbing coatings 245 is controlled by relatively rotating and moving between the lens element platform 291 and the needle 290.

In FIG. 2A, the photographing lens module 2000 includes, in order from an object side to an image side, lens elements 2101, 2102, 2103, 2104, the plastic lens element 200 and a lens element 2105. The photographing lens module 2000 has a total of six lens elements. The plastic lens element 200 is the fifth lens element of the photographing lens module 2000 in order from the object side to the image side, wherein the effective optical portion 221 of the object-side surface 201 of the plastic lens element 200 has a wavy shape. Furthermore, the photographing lens module 2000 further includes a spacer 2201 disposed between the lens element 2104 and the plastic lens element 200, and the object-side surface 201 further includes an object-side abutting area 211, which is orthogonal to the optical axis of the plastic lens element 200. The object-side abutting area 211 is abutted with the spacer 2201, and the strip rib structures 241 are farther from the effective optical portion 221 than the object-side abutting area 211.

The data of the parameters Ra and w of the photographing lens module 2000 according to the 2nd embodiment of the present disclosure are listed in the following Table 2, wherein the parameters are also shown as FIG. 2C. The definitions of these parameters shown in Table 2 are the same as those stated in the 1st embodiment with corresponding values for the 2nd embodiment.

TABLE 2

| 2nd Embodiment | |
|---|---|
| Ra (μm) | 0.56~0.8 |
| w (mm) | 0.02 |

3rd Embodiment

Figure 3A:
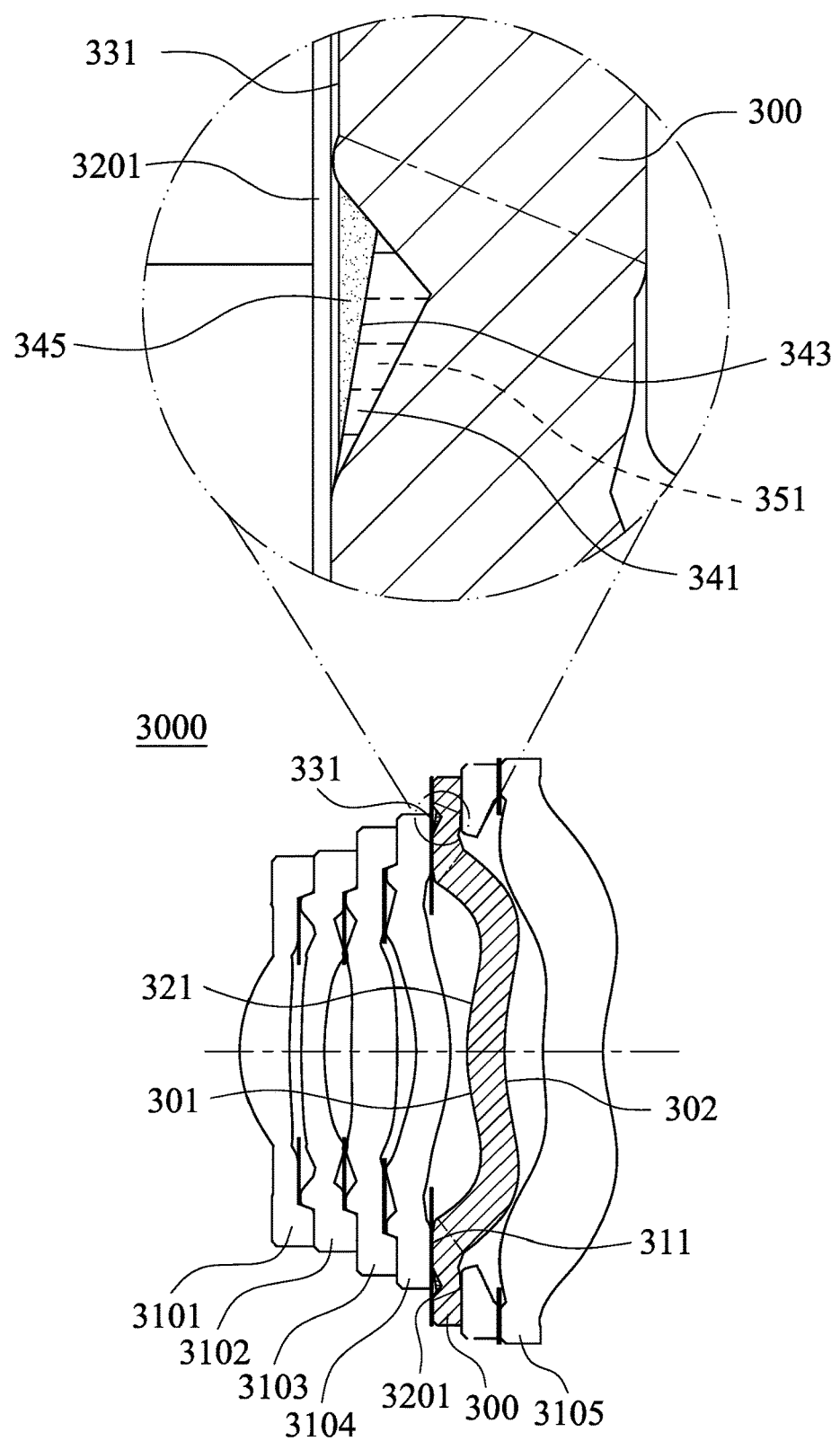
FIG. 3A is a schematic view of a photographing lens module according to the 3rd embodiment of the present disclosure.

FIG. 3A is a schematic view of a photographing lens module 3000 according to the 3rd embodiment of the present disclosure. In FIG. 3A, the photographing lens module 3000 includes a plurality of lens elements, wherein one of the lens elements is a plastic lens element 300, and at least one surface of an object-side surface 301 and an image-side surface 302 of the plastic lens element 300 (the aforementioned surface is the object-side surface 301 in the 3rd embodiment) includes an effective optical portion 321 and a peripheral portion 331.

Figure 3B:
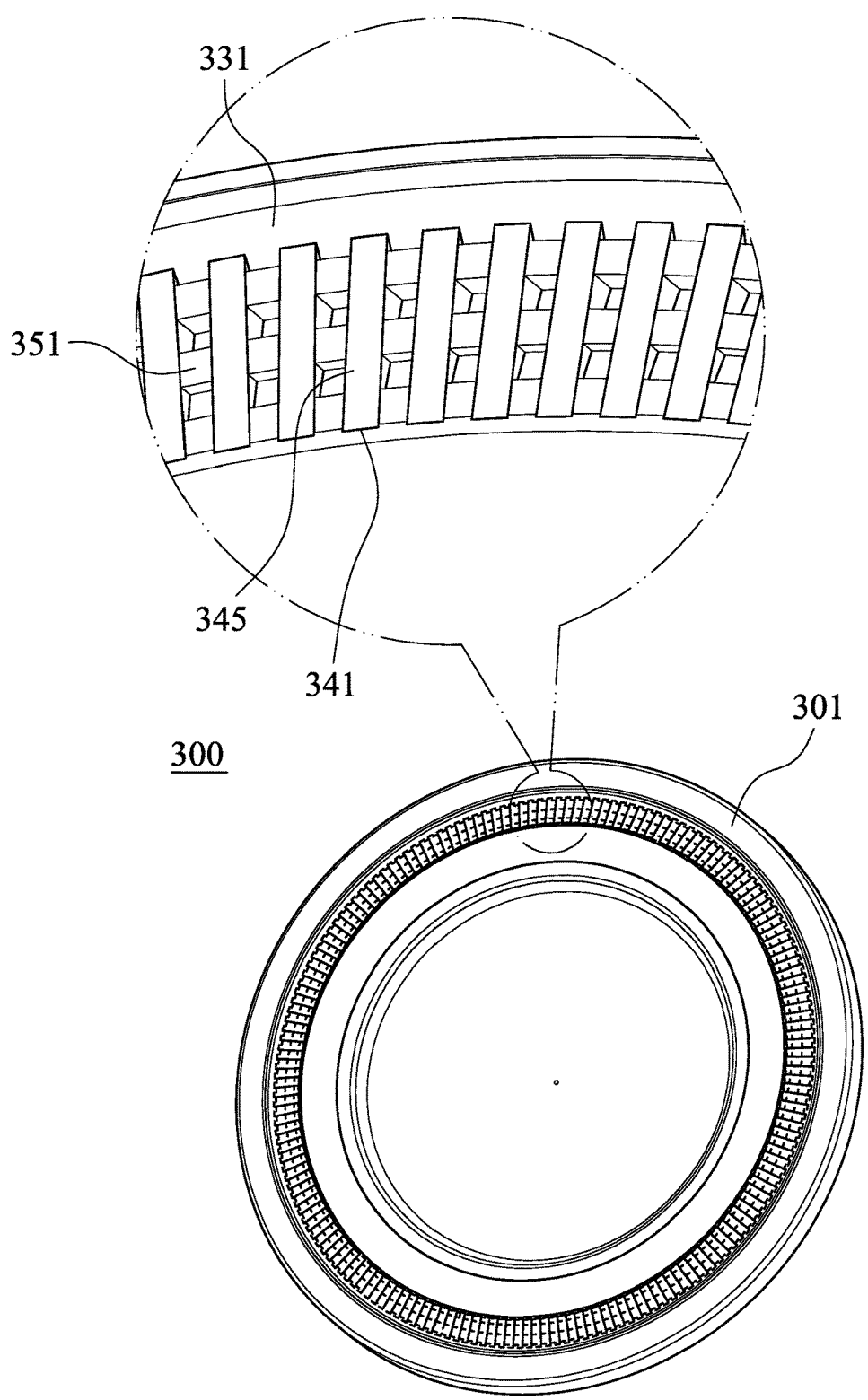
FIG. 3B is a schematic view of the plastic lens element according to the 3rd embodiment.
Figure 3C:
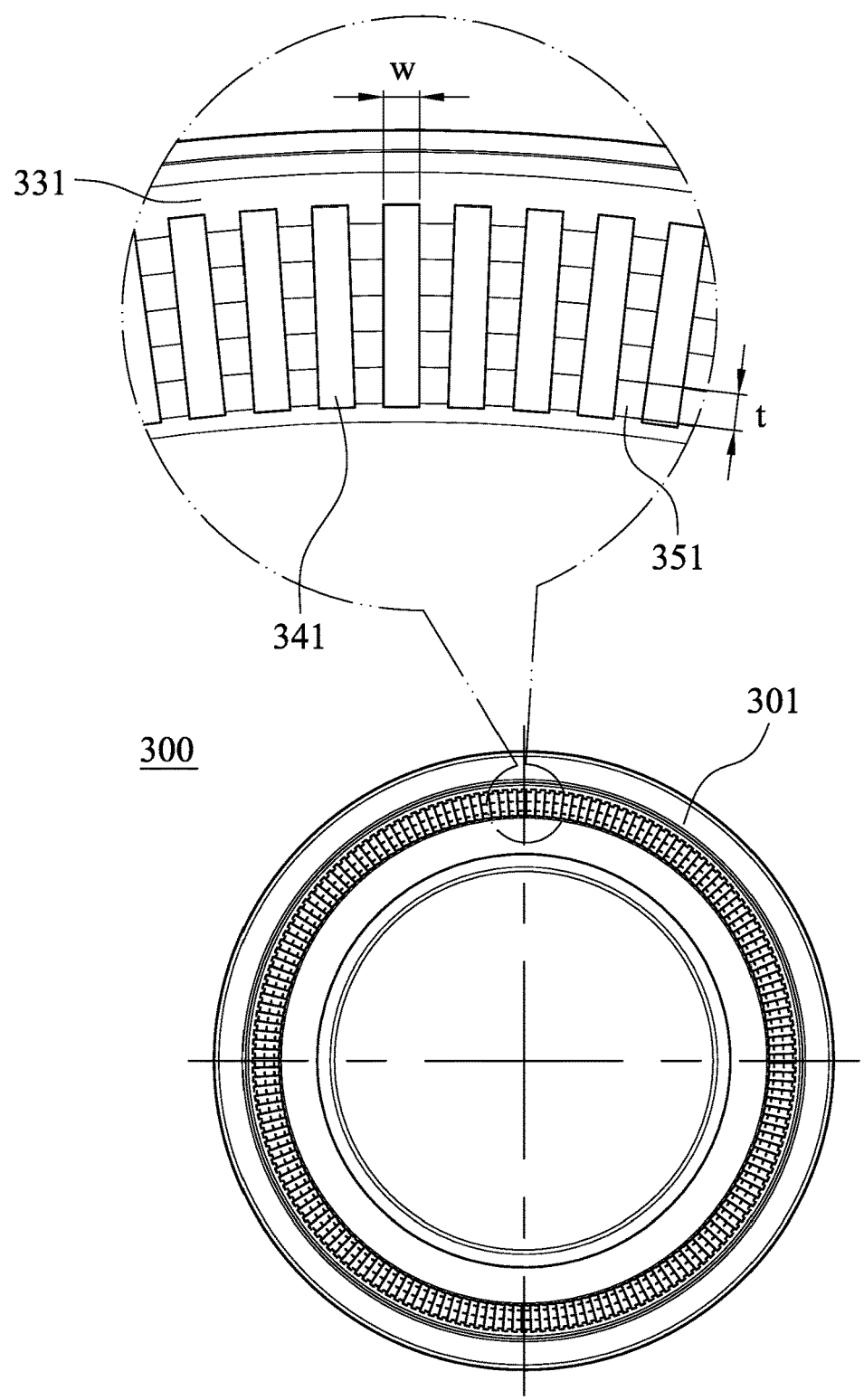
FIG. 3C is a schematic view of the parameters w and t of the plastic lens element according to the 3rd embodiment.

FIG. 3B is a schematic view of the plastic lens element 300 according to the 3rd embodiment, and FIG. 3C is a schematic view of the parameters w and t of the plastic lens element 300 according to the 3rd embodiment. In FIG. 3A to FIG. 3C, the effective optical portion 321 is aspheric. The peripheral portion 331 surrounds the effective optical portion 321, and includes a plurality of strip rib structures 341 and a plurality of light absorbing coatings 345. Each of the strip rib structures 341 has a strip shape along a radial direction of an optical axis of the plastic lens element 300, and the strip rib structures 341 are arranged around the effective optical portion 321. The light absorbing coatings 345 are coated on the strip rib structures 341 respectively.

In FIG. 3B, the strip rib structures 341 are arranged as a plurality of stepped shapes along a circumferential direction of the plastic lens element 300. A number of the strip rib structures 341 is n, and the following condition is satisfied: 90<n<720.

In FIG. 3A and FIG. 3B, each of all surfaces of each of the strip rib structures 341 includes a light diminishing surface 343, which is a rough surface and is disposed on whole area of the surface thereof. Each of the light absorbing coatings 345 is coated on all of the light diminishing surfaces 343 disposed on all surfaces of each of the strip rib structures 341. Furthermore, the light absorbing coatings 345 are made of black resin materials and connected to each other for forming an annular shape.

Figure 3D:
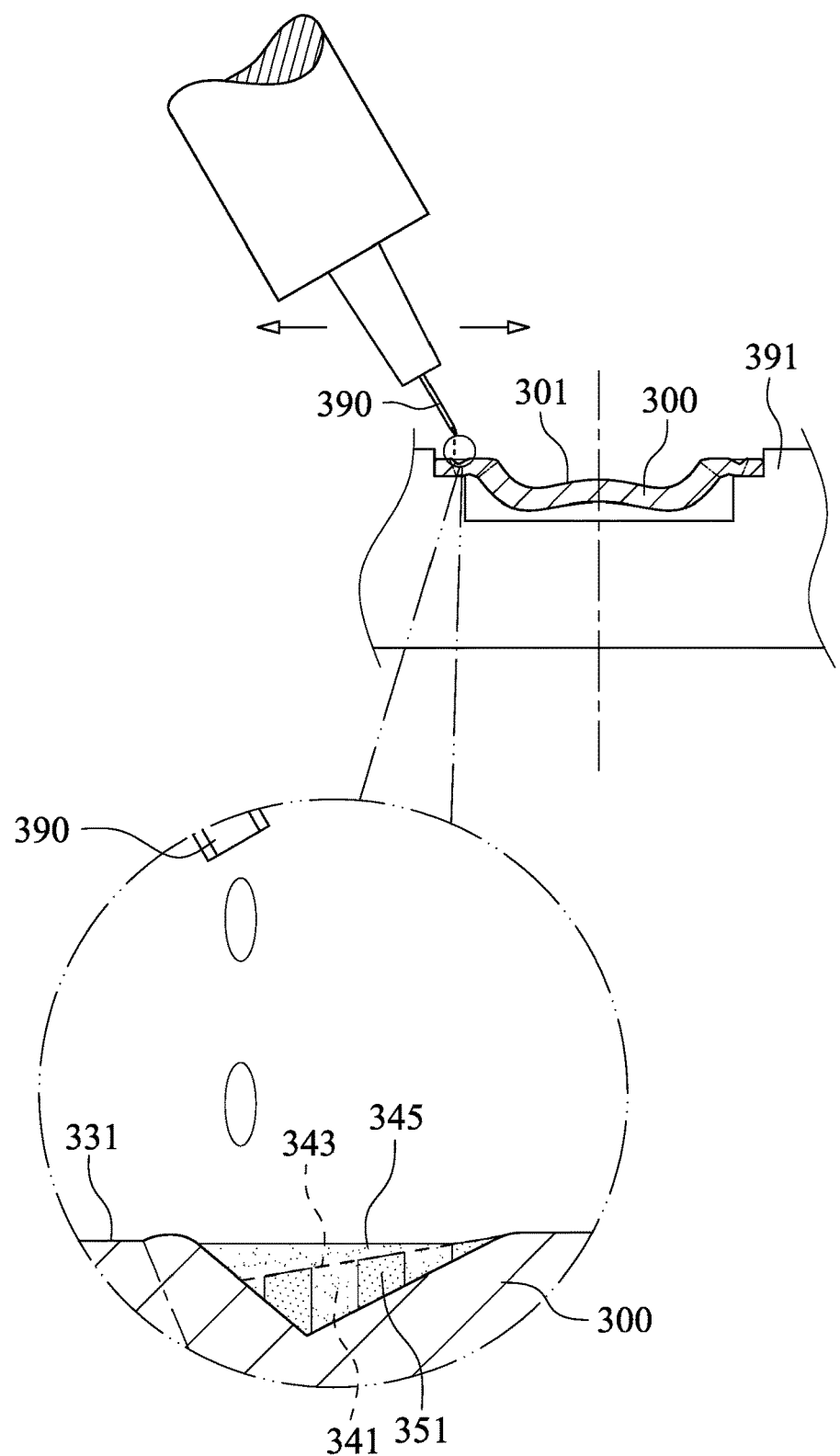
FIG. 3D is a schematic view of the light absorbing coatings coated by a needle according to the 3rd embodiment.

FIG. 3D is a schematic view of the light absorbing coatings 345 coated by a needle according to the 3rd embodiment. In FIG. 3D, the light absorbing coatings 345 are coated by a needle 390. The steps of the light absorbing coatings 345 coated by the needle 390 include placing the plastic lens element 300 with the image-side surface 302 upwards on a lens element platform 391, and placing the needle 390 above the strip rib structures 341 of the plastic lens element 300. The coating range of the light absorbing coatings 345 is controlled by relatively moving between the lens element platform 391 and the needle 390.

In FIG. 3A to FIG. 3C, the peripheral portion 331 further includes three annular rib structures 351 surrounding the effective optical portion 321. The annular rib structures 351 and the strip rib structures 341 are intersected and formed as a woven pattern, which is a grid pattern, wherein a height of the annular rib structures 351 relative to the peripheral portion 331 is the same as a height of the strip rib structures 341 relative to the peripheral portion 331. Moreover, the annular rib structures 351 are coated with the light absorbing coatings 345.

In FIG. 3A, the photographing lens module 3000 includes, in order from an object side to an image side, lens elements 3101, 3102, 3103, 3104, the plastic lens element 300 and a lens element 3105. The photographing lens module 3000 has a total of six lens elements. The plastic lens element 300 is the fifth lens element of the photographing lens module 3000 in order from the object side to the image side, wherein the effective optical portion 321 of the object-side surface 301 of the plastic lens element 300 has a wavy shape. Furthermore, the photographing lens module 3000 further includes a spacer 3201 disposed between the lens element 3104 and the plastic lens element 300, and the object-side surface 301 further includes an object-side abutting area 311, which is orthogonal to the optical axis of the plastic lens element 300. The object-side abutting area 311 is abutted with the spacer 3201, and the strip rib structures 341 are farther from the effective optical portion 321 than the object-side abutting area 311.

The data of the parameters Ra, w and t of the photographing lens module 3000 according to the 3rd embodiment of the present disclosure are listed in the following Table 3, wherein the parameters are also shown as FIG. 3C. The definitions of these parameters shown in Table 3 are the same as those stated in the 1st embodiment with corresponding values for the 3rd embodiment.

TABLE 3

| 3rd Embodiment | |
|---|---|
| Ra (μm) | 1.6~3.15 |
| w (mm) | 0.04 |
| t (mm) | 0.04 |

4th Embodiment

Figure 4:
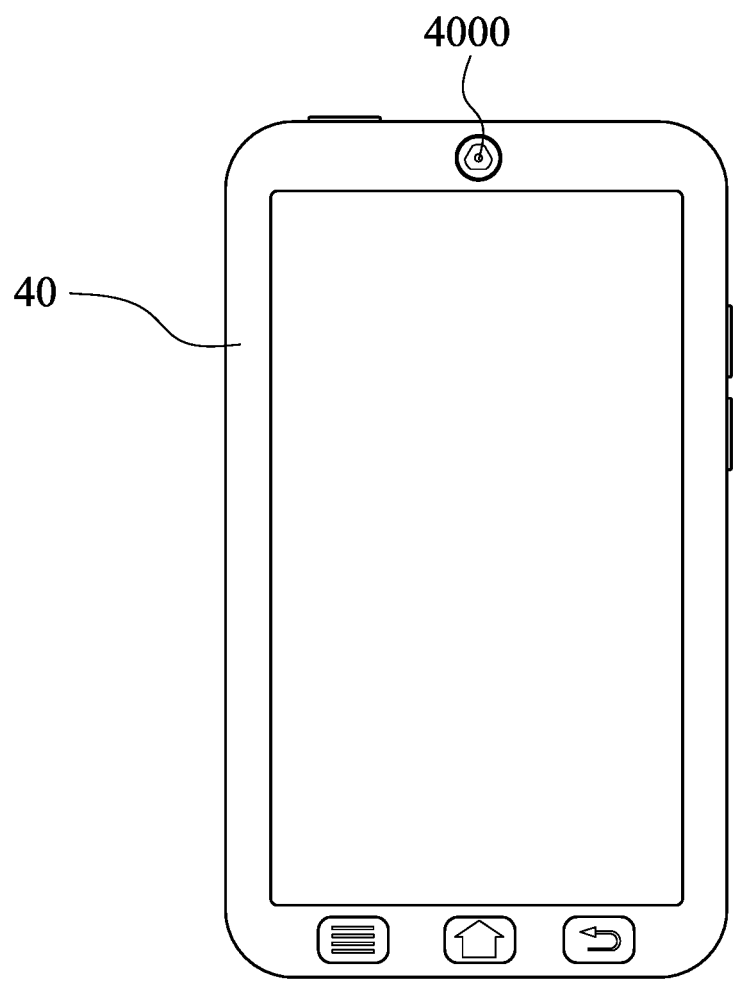
FIG. 4 shows an electronic device according to the 4th embodiment of the present disclosure.

FIG. 4 shows an electronic device 40 according to the 4th embodiment of the present disclosure. The electronic device 40 of the 4th embodiment is a smart phone, wherein the electronic device 40 includes a photographing lens module 4000 according to the present disclosure. Therefore, it is favorable for effectively attenuating the reflection of the non-imaging light of the photographing lens module 4000 so as to enhance the image quality and satisfy the requirements of high-end electronic devices with camera functionalities. Furthermore, the electronic device 40 can further include an image sensor (not shown herein) disposed on or near an image surface of the photographing lens module 4000. Preferably, the electronic device 40 can further include but not limited to a display, a control unit, a storage unit, a random access memory unit (RAM), a read-only memory unit (ROM) or a combination thereof.

5th Embodiment

Figure 5:
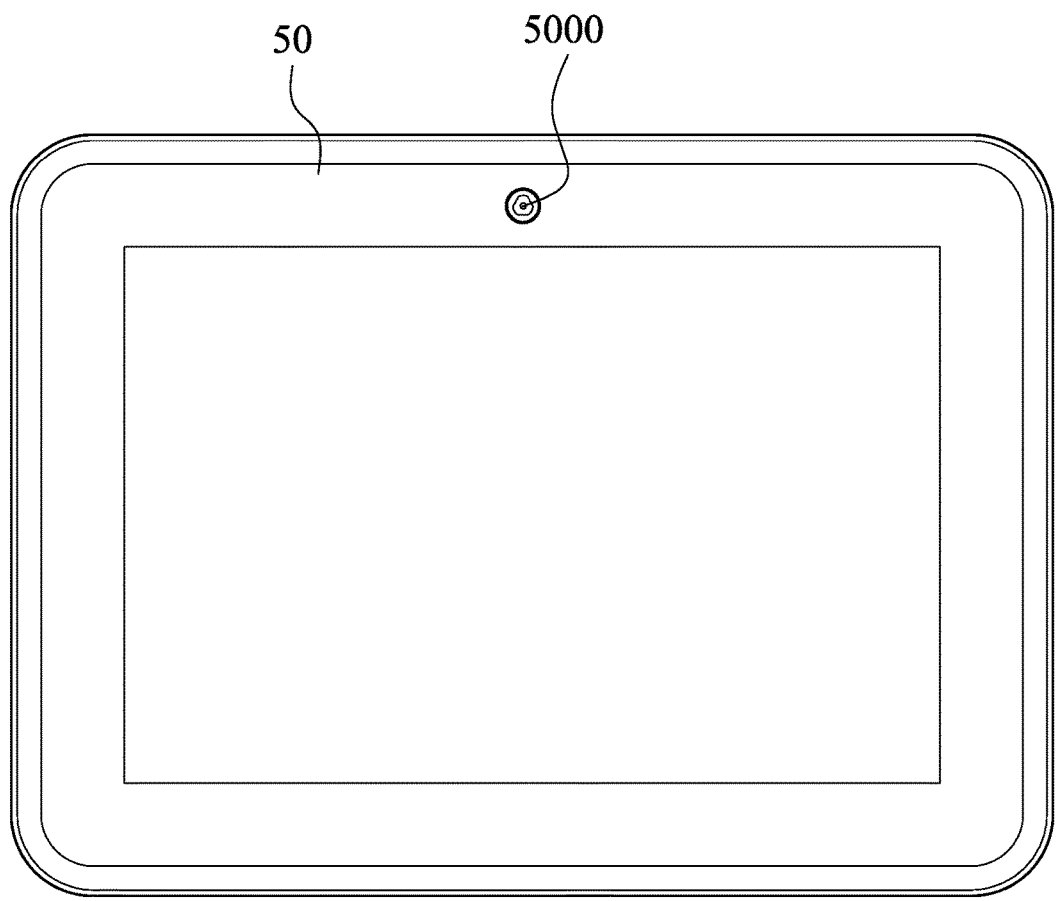
FIG. 5 shows an electronic device according to the 5th embodiment of the present disclosure.

FIG. 5 shows an electronic device 50 according to the 5th embodiment of the present disclosure. The electronic device 50 of the 5th embodiment is a tablet personal computer, wherein the electronic device 50 includes a photographing lens module 5000 according to the present disclosure.

6th Embodiment

Figure 6:
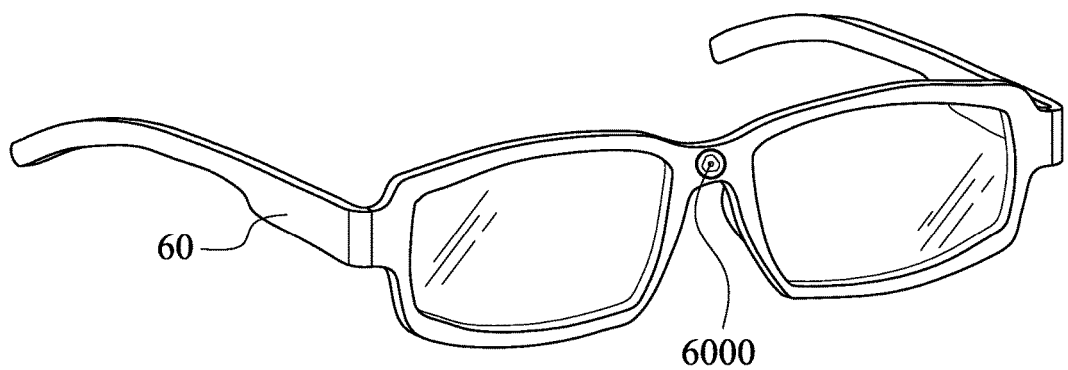
FIG. 6 shows an electronic device according to the 6th embodiment of the present disclosure.

FIG. 6 shows an electronic device 60 according to the 6th embodiment of the present disclosure. The electronic device 60 of the 6th embodiment is a wearable device, wherein the electronic device 60 includes a photographing lens module 6000 according to the present disclosure.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A photographing lens module, comprising a plurality of lens elements, wherein one of the lens elements is a plastic lens element, and at least one surface of an object-side surface and an image-side surface of the plastic lens element comprises:
   an effective optical portion being aspheric; and
   a peripheral portion surrounding the effective optical portion and comprising:
   a plurality of strip rib structures, wherein each of the strip rib structures has a strip shape along a radial direction of an optical axis of the plastic lens element, and the strip rib structures are arranged around the effective optical portion;
   a plurality of light absorbing coatings coated on the strip rib structures respectively; and
   at least one annular rib structure surrounding the effective optical portion and intersecting with the strip rib structures.

2. The photographing lens module of claim 1, wherein the light absorbing coatings are made of black resin materials.

3. The photographing lens module of claim 1, wherein the strip rib structures are arranged as a plurality of stepped shapes along a circumferential direction of the plastic lens element.

4. The photographing lens module of claim 1, wherein a width of each of the strip rib structures is w, and the following condition is satisfied:

$0.01$ mm$<w<0.12$ mm.

5. The photographing lens module of claim 1, wherein a number of the strip rib structures is n, and the following condition is satisfied:

$90<n<720$.

6. The photographing lens module of claim 1, wherein the light absorbing coatings are connected to each other for forming an annular shape.

7. The photographing lens module of claim 1, wherein a number of the annular rib structure is at least two, and the annular rib structures and the strip rib structures are formed as a woven pattern.

8. The photographing lens module of claim 1, wherein the annular rib structure is coated with the light absorbing coatings.

9. The photographing lens module of claim 1, wherein a width of the annular rib structure is t, and the following condition is satisfied:

$0.01$ mm$<t<0.12$ mm.

10. The photographing lens module of claim 1, wherein a number of the lens elements of the photographing lens module is at least four.

11. The photographing lens module of claim 10, wherein the surface of the plastic lens element is the object-side surface and further comprises:
   an object-side abutting area, wherein the strip rib structures are farther from the effective optical portion than the object-side abutting area from the effective optical portion.

12. The photographing lens module of claim 1, wherein the light absorbing coatings are coated by a needle.

13. The photographing lens module of claim 1, wherein at least one surface of each of the strip rib structures comprises a light diminishing surface.

14. The photographing lens module of claim 13, wherein a surface roughness of the light diminishing surface is Ra, and the following condition is satisfied:

$$0.1 \ \mu m < Ra.$$

15. The photographing lens module of claim 1, wherein the effective optical portion has a wavy shape.

16. The photographing lens module of claim 1, wherein the plastic lens element is the fourth lens element of the photographing lens module in order from an object side to an image side.

17. An electronic device, comprising:
the photographing lens module of claim 1.

* * * * *